Jan. 31, 1961
L. F. URRY
2,970,180
ALKALINE DEFERRED ACTION CELL
Filed June 17, 1959
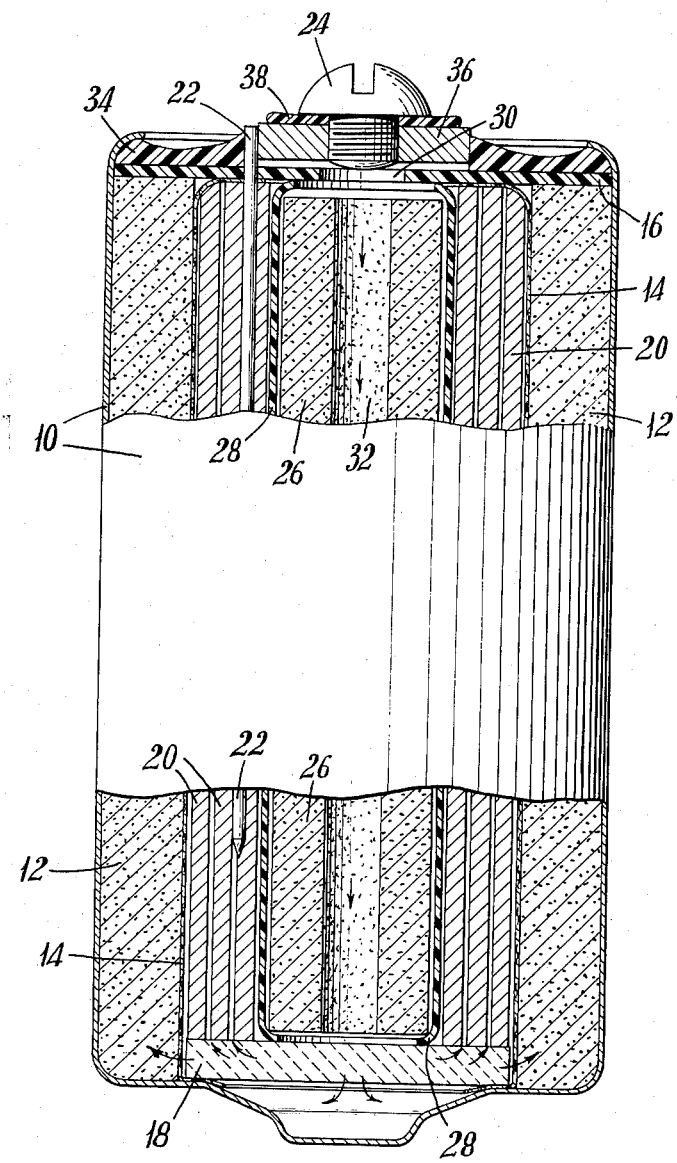
INVENTOR.
LEWIS F. URRY
BY *John F. Hohmann*
ATTORNEY

United States Patent Office 2,970,180
Patented Jan. 31, 1961

2,970,180
ALKALINE DEFERRED ACTION CELL

Lewis F. Urry, Parma, Ohio, assignor to Union Carbide Corporation, a corporation of New York Filed June 17, 1959, Ser. No. 821,032

7 Claims. (Cl. 136—90)

This invention relates to primary dry cells which employ an alkaline electrolyte and more particularly, to deferred action type cells which may be stored indefinitely in the dry state and activated merely by the addition of water.

Considerable efforts have been expended in constructing deferred action cells which utilize an electron producing zinc anode, an ion carrying caustic electrolyte, and a hydroxyl ion producing manganese dioxide cathode. The term "deferred action cell" refers to the type of cell wherein liquid electrolyte does not contact the electrodes of the cell until it is to be put in service, thus avoiding problems of shelf deterioration and leakage.

The prior art has suggested deferred action cells which utilize a frangible ampoule containing liquid electrolyte which, when broken permits the electrolyte therefrom to contact the cell electrodes and thus activate the cell. However, the ampoule is often accidentally broken by shock of impact before it is desired to activate and use the cell. Also, such cells may not give optimum performance at low temperatures as a result of the high viscosity of the electrolyte at those temperatures and resultant lack of rapid contact between electrodes and electrolyte. The latter disadvantage may also be encountered in deferred action cells which are assembled without the use of ampoules and which are activated by the addition of concentrated liquid electrolyte. Moreover, when the liquid electrolyte is a corrosive caustic solution, certain handling dangers are involved.

A preferred type of deferred action cell is one wherein an electrolyte solute is initially incorporated in the cell and which may be activated merely by the addition of water. In this type cell, the activating liquid is readily obtainable from many sources and the dangers involved in handling corrosive caustic solutions are avoided. The necessary amount of water which must be added to properly activate the cell may be incorporated within the cell in a frangible ampoule or preferably may be added externally. External addition of water is preferred, for it provides additional internal volume which is available for the active materials of the cell in comparison with ampoule-containing deferred action cells which, after activation, derive no further use from the space allotted thereto.

The principal object of the invention is to provide a novel primary cell of the deferred action type which prior to activation is inert, whose shelf life is practically unlimited, and which may be activated merely by the external addition of water.

Another object of the invention is to provide a novel primary cell of the deferred action type which may be activated when the cell is connected into the discharge load.

A still further object of the invention is to provide a novel primary cell of the deferred action type which is suitable for low temperature applications.

These and other related objects and advantages of the present invention will become apparent as the description thereof proceeds, particularly when taken in conjunction with the accompanying drawing wherein the single figure is a front elevational view, partially in section, of a cell in accordance with the principles of the invention.

Broadly stated, the objects of the invention are accomplished by a cell which suitably comprises a carbon-manganese dioxide cathode preferably held together with a cement binder; a separator, suitably of a non-woven paper material; a zinc anode suitably constructed by flame spraying zinc particles onto a fabric support, such as muslin; a solid electrolyte in the form of a cast cylinder of potassium hydroxide or sodium hydroxide; a gelling agent such as carboxymethylcellulose, hereafter referred to as CMC; a cupped steel can serving as both the cell container and cathode current collector; a central flow channel for the activating liquid; and a suitable liquid and gas tight closure for the open end of the cupped container, which includes a screw plug serving the dual purpose of providing the external anode electrical contact and also of sealing the central flow channel.

More particularly, a cathode which may be employed in the cell of the invention is molded from a mix which comprises electrically conductive carbon, electrolytic manganese dioxide, an inorganic cement such as Portland cement and water. Generally this type cathode may contain 5% to 20% by weight of cement, as disclosed and claimed in the co-pending application of K. Kordesch, Serial No. 689,082, filed October 9, 1957, now United States Patent No. 2,962,540, issued September 29, 1960. Prior to incorporation within the cell of this invention the water which is added to the mix to facilitate molding and handling must be allowed to evaporate. After the water has evaporated, the cathode is of suitable porosity to permit rapid absorption of the electrolyte during activation of the cell.

The separator employed in the cell of the invention must be one which prevents the migration of particles between the anode and cathode. Further, the separator must be held physically in the required position within the cell during long periods of dry storage and, upon activation of the cell, must permit rapid transfer of the activating liquid from the central filling channel to the dry cathode. Among suitable separators which may be employed are kraft paper and a non-woven paper of felted "Dynel" fibers. "Dynel" comprises resinous copolymers of vinyl chloride and acrilonitrile containing around 60 percent of the vinyl chloride in the polymer and is a material disclosed and claimed in the patent of Ruggeley et al. (U.S. Patent 2,420,565).

The preferred anode for use in the cell of the invention is a zinc anode constructed by flame spraying zinc particles onto a fabric support such as muslin. Such anodes may be prepared for example, as disclosed and claimed in the co-pending application of P. A. Marsal, Serial No. 747,769, filed July 10, 1958, by projecting finely divided zinc particles onto a muslin support utilizing a conventional device known commercially as a "Schori" pistol with an oxygen-fuel gas mixture for the flame and compressed air to convey the zinc particles through the flame. By the employment of this type anode construction, the proper amount of zinc for optimum cell operation may be confined to a minimum volume without excessive packing and the resultant limitation of the discharge performance. In the cell of the invention, the proper amount of zinc may be incorporated in an anode of this type in the form of a coiled cylinder of under 0.1 inch wall thickness. The particles of zinc in the sprayed sheet are all in constant metal-to-metal contact so that any portion of the sheet that is wet is assured of electrical contact with the anode collector. The sprayed zinc anode sheets, before coiling and insertion into the cell, may be amalgamated with by applying thereto a CMC water-mercuric oxide paint containing, for example about 1.3% CMC, 26% mercuric oxide, remainder water as described in the co-pending application of L. F. Urry, Serial No. 747,583, filed July 10, 1958.

An important novel feature of the cell construction of the invention is the manner in which the caustic for the electrolyte is incorporated in the cell prior to the addition of the activating liquid. The caustic sodium hydroxide or potassium hydroxide is cast in the form of a hollow cylinder which fits into the interior of the coiled zinc anode. The actual casting of the cylinder may suitably be accomplished by melting the solid alkali and forming a cylinder in a mold, or by crushing chips or pellets of the alkali to a powder and forming a cylinder therefrom under pressure. The use of discrete caustic flakes or pellets within the cell is not satisfactory for they fuse into a solid mass upon the addition of water and completely block the further flow of water, but the use of a cast cylinder facilitates the incorporation of sufficient caustic in the anode cavity while maintaining an unobstructed passage for water. The central space in the cast cylinder serves as the flow channel for the activating water and permits the water to flow freely to the bottom of the cylinder. The potassium hydroxide or sodium hydroxide dissolves in the water as it flows down the center of the cylinder. From there, the electrolyte, which is now approximately a nine normal electrolyte solution, will rise within the cell displacing the air ahead of it, and in a matter of seconds all interstices are filled.

The gelling agent, CMC, is employed in the cell of the invention to immobilize the free electrolyte once the cell is activated. The CMC is incorporated in the inactive cell in such a manner that it remains in the desired location, does not block the flow of the activating water, and does not swell prematurely, thus blocking the flow path before the necessary amount of water has been added. The above-described amalgamating of the anode with a CMC-water mercuric oxide paint provides one means of incorporating the CMC in a desired location. This may also be accomplished by wrapping a film of dry CMC, which was cast from a CMC water-solution, around the potassium hydroxide or sodium hydroxide cylinder prior to the insertion of the latter into the cell. After addition of the activating water and dissolution of the caustic, the gell will absorb the electrolyte and slowly swell until the anode cavity is completely filled. Thus, the electrolyte is adequately distributed throughout the cell in an immobilized state.

Referring now to the drawing, the preferred embodiment of the cell of the invention in its assembled and unactivated condition comprises an outer cup shaped steel can container 10 serving also as the cathode current collector, a cement bonded carbon-manganese dioxide cathode 12 in contact with the container 10, and an ionically permeable separator 14 of "Dynel" fibers or kraft paper in contact with the cathode 12. When assembling the cell, the edges of the separator 14 are folded inward so that when the washer 16 and the highly porous ceramic washer 18 are placed, effective seals are provided against the migration of anode or cathode particles.

The anode 20, which comprises flame sprayed zinc particles on a muslin support, is in contact with the other side of the separator 14. Leading from the anode 20 is a current collector 22 which is in electrical contact with a screw plug 24 which serves as the positive terminal of the cell.

Located in the center of the cell is the hollow cast cylinder 26 of potassium hydroxide or sodium hydroxide. As mentioned above, the caustic cylinder 26 is covered with a film 28 of CMC. The cell is sealed by placing the washer 16 across the top of the cell components, the aperture 30 in the washer 16 being in alignment with the hollow 32 in the caustic cylinder 26 which serves as the central filling channel, and hot epoxy resin 34 is poured on the washer 16, and a nut 36 is set therein so that it contacts the anode collector 22 and so that it is in proper alignment over the central filling channel 32 before the epoxy resin 34 hardens. The steel container 10 is then crimped over onto the epoxy resin 34. The closure of the cell is completed by the screw plug 24 which is threaded into the nut 36 and screwed down tight against an elastomeric gasket 38. The closure serves to prevent the undesirable entry of carbon dioxide, water vapor and/or oxygen to the cell prior to activation and insures a good shelf life.

When it is desired to activate the cell it is only necessary to remove the screw plug 24 and add water to the cell. The water will flow down the central filling channel 32, dissolving the caustic sodium hydroxide or potassium hydroxide as it passes. The now 9 normal electrolyte solution will pass through the highly porous ceramic washer 18 and will rise within the cells as shown by the arrows in the drawing and be absorbed by the CMC film 28 which will slowly swell until the anode cavity is completed filled. The electrolyte is then suitably distributed throughout the cell in an immobilized state for efficient cell operation. After the water is added the screw plug 24 is again screwed down on the gasket 38 and once again provides a liquid and gas tight seal.

An important advantage of the above construction is that the cells are self-warming. The heat of solution of the solid caustic electrolyte in the activating water raises the cell temperature as much as 45° F. above ambient room temperature. The cylindrical shape of the caustic cylinder permits even distribution of its heat of solution throughout the cell, thereby insuring proper functioning at sub-zero temperatures. The thus-heated cell will then perform at the higher efficiency associated with higher temperatures. For sub-zero applications this characteristic enables the cells of the invention to out-perform many of the expensive heavy duty cells such as silver cells.

Furthermore, the above described cell requires an activation period of the order of only 5 to 10 seconds to reach full amperage and open circuit voltage and the activation may therefore be accomplished while the cell is connected into the discharge load.

Those skilled in the art will recognize that many modifications may be made within the scope of this invention. For example, other cathode depolarizers such as mercuric oxide, silver oxide and nickel hydroxide may be employed as well as other anode and cathode materials and constructions which are suitable for use with alkaline electrolyte. Other alkaline electrolytes which may be successfully employed in cells for low temperature applications include barium hydroxide, calcium hydroxide, cesium hydroxide, lithium hydroxide, rubidium hydroxide, and strontium hydroxide.

I claim:

1. A deferred action alkaline dry cell which may be activated and uniformly self-heated by the external addition of water to form a liquid electrolyte, which comprises a cupped container, and in said container an anode, a cathode, a separator between said anode and said cathode, a hollow cylinder of a caustic material chosen from the group consisting of potassium hydroxide, sodium hydroxide, barium hydroxide, calcium hydroxide, cesium hydroxide, lithium hydroxide, rubidium hydroxide and strontium hydroxide, a film of a gelling agent between said anode and said hollow cylinder capable of absorbing and immobilizing said liquid electrolyte on activation of said cell, and a gas and liquid tight closure for said container which may be partially removed to allow for the addition of said activating water.

2. A deferred action alkaline dry cell which may be activated and uniformly self-heated by the external addition of water to form a liquid electrolyte, which comprises a cupped container and in said container a porous cement-bonded cathode mix consisting of manganese dioxide and carbonaceous particles, a coiled anode of flame sprayed zinc particles on a fabric support, a separator of a non-woven paper material between said anode and said cathode, a hollow cylinder of a caustic material chosen from the group consisting of potassium hydroxide and sodium hydroxide, a film of a gelling agent between said anode and said hollow cylinder capable of absorbing and immobilizing said liquid electrolyte on activation of said cell, and a gas and liquid tight closure for said container which may be partially removed to allow for the addition of said activating water.

3. The deferred action cell of claim 2 wherein said separator has its upper and lower ends turned inward to prevent migration of said particles of said anode and said cathode.

4. A deferred action alkaline dry cell which may be activated and uniformly self-heated by the external addition of water to form a liquid electrolyte which comprises a cupped container and in said container a porous, cathode mix consisting of manganese dioxide and carbonaceous particles which are bonded together with Portland cement, a coiled anode of flame sprayed zinc particles on a muslin support, a separator of a non-woven paper material chosen from he group consisting of "Dynel" and kraft paper between said anode and said cathode and having its upper and lower ends turned inward to prevent the migration of said particles of said anode and said cathode, a hollow cylinder of a caustic material chosen from the group consisting of potassium hydroxide and sodium hydroxide, a film of carboxymethylcellulose between said anode and said hollow cylinder capable of absorbing and immobilizing said liquid electrolyte on activation of said cell, and a gas and liquid tight closure for said container which may be partially removed to allow for the addition of said activating water.

5. The deferred action cell of claim 4 wherein said film of carboxymethylcellulose between said anode and said hollow cylinder is incorporated in said cell by amalgamating said zinc anode with a carboxymethylcellulose-water-mercuric oxide paint.

6. In a deferred action water activated alkaline dry cell which comprises a cupped container and in said container a cathode, an anode, a separator between said anode and said cathode, a centrally located electrolyte producing caustic material, a film of a gelling agent between said anode and said electrolyte material capable of absorbing and immobilizing said electrolyte on activation of said cell, and a gas and liquid tight closure for said container which may be partially removed to allow for the addition of said activating water; the improvement consisting of said electrolyte producing caustic being solid and in the form of a hollow cylinder cast from a material chosen from the group consisting of potassium hydroxide, sodium hydroxide, barium hydroxide, calcium hydroxide, cesium hydroxide, lithium hydroxide, rubidium hydroxide and strontium hydroxide, whereby the heat of solution thereof upon activation of said cell by the addition of said water is uniformly distributed throughout said cell.

7. In a deferred action water activated alkaline dry cell which comprises a cupped container and in said container a porous cement bonded cathode mix consisting of manganese dioxide and carbonaceous particles, a coiled anode of flame sprayed zinc particles on a fabric support, a separator of a non-woven paper material between said anode and said cathode, a centrally located electrolyte producing caustic material, a film of a gelling agent between said anode and said electrolyte material capable of absorbing and immobilizing said electrolyte on activation of said cell, and a gas and liquid tight closure for said container which may be partially removed to allow for the addition of said activating water; the improvement consisting of said electrolyte producing caustic material being solid and in the form of a hollow cylinder cast from a material chosen from the group consisting of potassium hydroxide and sodium hydroxide, whereby the heat of solution thereof upon activation of said cell by the addition of said water is uniformly distributed throughout said cell.

References Cited in the file of this patent

UNITED STATES PATENTS 2,896,067    Lockwood _____ July 21, 1959